(12) United States Patent
Shadwell

(10) Patent No.: US 7,793,786 B2
(45) Date of Patent: Sep. 14, 2010

(54) VEHICULAR PLASTIC COATING

(75) Inventor: Richard E. Shadwell, 193 Sayers Rd., Bastrop, TX (US) 78602

(73) Assignee: Richard E. Shadwell, Bastrop, TX (US)

( * ) Notice: Subject to any disclaimer, the term of this patent is extended or adjusted under 35 U.S.C. 154(b) by 441 days.

(21) Appl. No.: 11/339,603

(22) Filed: Jan. 25, 2006

(65) Prior Publication Data
US 2006/0201605 A1 Sep. 14, 2006

Related U.S. Application Data

(60) Provisional application No. 60/661,787, filed on Mar. 14, 2005.

(51) Int. Cl.
*B65D 69/00* (2006.01)
(52) U.S. Cl. .................. 206/582; 206/524.1; 206/813
(58) Field of Classification Search ............... 206/582, 206/576, 229, 447, 813, 524.1
See application file for complete search history.

(56) References Cited

U.S. PATENT DOCUMENTS

| 4,948,443 A * | 8/1990 | Speer ............................. 156/94 |
| 5,384,159 A | 1/1995 | Gillette et al. |
| 5,643,513 A * | 7/1997 | Searle ........................ 264/46.5 |
| 5,714,208 A * | 2/1998 | Ferrell et al. ................. 427/558 |
| 6,478,561 B2 * | 11/2002 | Braun et al. ................... 425/12 |
| 6,831,049 B1 | 12/2004 | Torres Moreno |
| 6,984,612 B2 | 1/2006 | Maillie |
| 7,045,001 B1 | 5/2006 | Kropp et al. |
| 7,163,446 B1 | 1/2007 | Cole et al. |
| 2003/0038397 A1 * | 2/2003 | MacAllister et al. ......... 264/222 |
| 2004/0256335 A1 * | 12/2004 | Sholem ....................... 211/70.6 |

* cited by examiner

*Primary Examiner*—Jacob K Ackun, Jr.
(74) *Attorney, Agent, or Firm*—Garland D. Charpiot; Schubert Law Group PLLC

(57) ABSTRACT

Systems; articles of manufacture, and methods to coat vehicular plastics with an epoxy are disclosed. Embodiments of the invention provide an extremely durable epoxy coating on various plastic parts of a vehicle. One embodiment includes a system that may be used to remove damaged plastic and any existing hard coat material, such as silicone, from the surface of a vehicular plastic. Such embodiments may also include the epoxy coating and tools necessary for applying the epoxy. Another embodiment discloses a process for preparing and sealing a vehicular plastic with an epoxy coating.

20 Claims, 4 Drawing Sheets

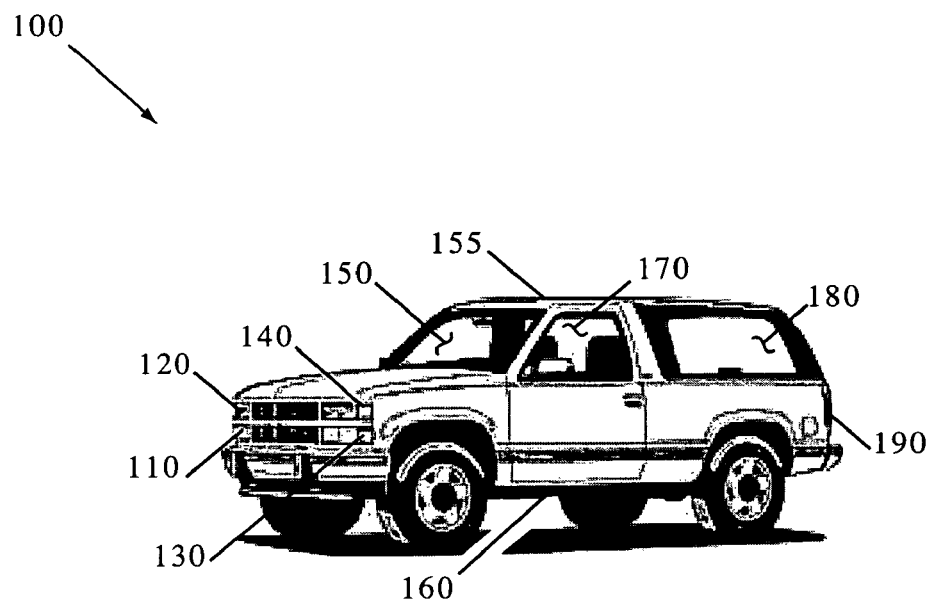
FIG 1
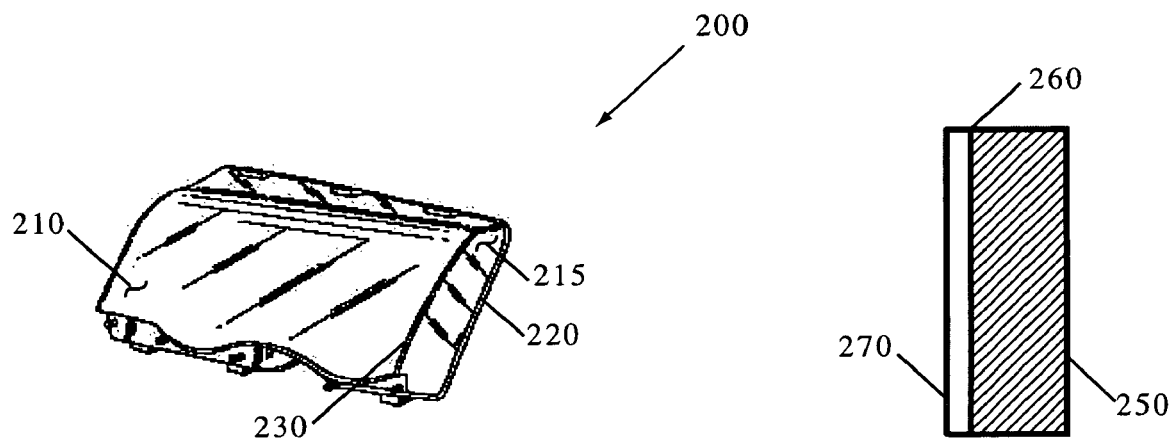
FIG 2A
FIG 2B

VEHICULAR PLASTIC COATING

FIELD OF INVENTION

The present invention is in the field of vehicular plastics. More particularly, the present invention relates to systems, articles of manufacture, and methods for coating plastic vehicle covers, windows, windshields, and other vehicular plastics.

BACKGROUND

In the United States of America over 240 million cars and light trucks travel the roads and highways. If one includes Canada, the number of cars and light trucks increases to 259 million. While manufacturing virtually all of these vehicles, automobile manufacturers continually strive to improve motor performance and increase overall fuel efficiency. One fundamental objective to increase fuel efficiency is to replace current materials with lighter weight yet structurally similar materials.

A large percentage of vehicles, especially those manufactured within the last 10 to 15 years, utilize plastic for headlight and tail light covers. Although less common, millions of vehicles also have plastic windows and windshields. Of the various materials available to make these plastics, a majority of automotive manufacturers make these plastic parts from a polycarbonate material. Polycarbonate is an amorphous, thermoplastic molding compound discovered in the 1950's. Polycarbonate plastic qualities include high light transmission, high heat resistance, high impact strength, good dimensional stability, and low weight. Furthermore, manufacturers can form polycarbonate in a number of different shapes for parts such as headlights and tail lights.

Even though polycarbonate has many desirable qualities, this thermoplastic also has several undesirable qualities. Polycarbonate has relatively low resistance to ultraviolet light and relatively high porosity. In other words, extended exposure of polycarbonate to ultraviolet light and dirt turns the plastic from a completely clear and colorless material into one with a hazy yellow color. Over time, mere exposure to air oxidizes untreated polycarbonate plastic. When used as a material for headlights, heat from headlight lamps accelerates this oxidation process. Untreated polycarbonate surfaces also tend to absorb particulate matter from the surrounding environment. Dirt and grime particulates impregnate the porous surface of untreated polycarbonate. In the case of automotive headlights, the resulting oxidation, ultraviolet degradation, and dirt buildup on the plastic reduce the transmission of light from the headlight lamps. Essentially, the oxidized plastic and dirt tend to refract the light rays passing through the plastic medium. As more light rays are refracted away from the initial collated light pattern, the number of rays directed onto objects in the path of the vehicle is reduced, resulting in less safe driving conditions. Aside from this safety aspect, dingy and yellow headlight lamps reduce the attractiveness of the vehicle and reduce the overall vehicle resale value.

Manufacturers currently prevent degradation of the polycarbonate material by sealing the plastic with a second material, known as a hard coat. They apply a thin layer of silicone on the surface of the plastic to create this hard coat at the time the plastic is manufactured. Applying this sealant, or silicone hard coat, helps protect the polycarbonate material from ultraviolet damage, prevent oxidation of the polycarbonate surface, and prevent dirt and grime from lodging in the porous surface. Unfortunately, the silicone hard coat is not a permanent solution. While the silicone hard coat does resist oxidation, dirt, and damage from ultraviolet exposure, exposure to ultraviolet light significantly accelerates degradation of the hard coat layer, leaving vehicular polycarbonates substantially unprotected in as little as a year.

More specifically, several factors combine to separate the silicone hard coat from the polycarbonate surface. In the case of polycarbonate headlights, exposure to the environmental elements of rain, dirt, snow, and road salt, combine with heat from the headlight lamps to delaminate the silicone hard coat from the polycarbonate. Additionally, the silicone hard coat material is particularly susceptible to dents and dings from flying road debris deflected after hitting the coated lens assembly. Such damage to the hard coat layer allows air and water to penetrate the area where polycarbonate and silicone contact, accelerating the hard coat delamination process.

Once the silicone hard coat begins to separate from the polycarbonate, the unprotected polycarbonate is susceptible to degradation from ultraviolet light, dirt, water, and oxidation. As one can see, the shortcomings of silicone as a long-term sealant for polycarbonate covers are readily apparent.

Several factors impact how rapidly vehicular plastics degrade. One factor is where the vehicle is stored, either in a garage or in the sunlight. Obviously, the plastics of vehicles stored in direct sunlight degrade faster than vehicles stored in a garage. A second factor is the environment of the plastics while driving. For average vehicles, driven an average of 12,000 to 15,000 miles per year, plastics used for the headlight lenses degrade after a period of only three to five years. Vehicles exposed to roadways where high concentrations of salt are present, such as snowy roads in Colorado and Canada, or even the coastal regions along the oceans and the gulf, experience rapid plastic degradation. A third factor is the number of hours that the vehicle is on the road. Unlike non-commercial light trucks and cars, commercial trucks that log hundreds of miles each day experience rapid deterioration of the silicone hard coat and degradation of the polycarbonate headlights, with most lasting less than a year.

As mentioned, the degraded polycarbonate is both unattractive and presents the problem of unsafe driving conditions, especially when polycarbonate is used for headlights. In an attempt to remedy these problems, people have tried a variety of different solutions, all having drawbacks and limitations. One solution, which is probably the most drastic, is to simply replace the polycarbonate cover or entire headlight assembly. Certainly, this will offer an immediate solution. However new covers and assemblies for both commercial and noncommercial vehicles are quite costly. Then, the new cover or assembly will degrade just as quickly as those replaced.

Another common solution that people use to rejuvenate degraded polycarbonate is to simply remove the damaged silicone hard coat and damaged polycarbonate material. While this solution immediately remedies the appearance of the plastic, a major drawback to this solution is the fact that the exposed polycarbonate material rapidly deteriorates if not sealed with some secondary material. If one reseals the polycarbonate material with silicone, the solution offers temporary relief but the silicone degrades similar to new lenses. Alternatively, some people adopt a proactive philosophy and try to prevent degradation of the silicone hard coat and polycarbonate by applying a second sealant, such as wax. Applying a second sealant has the benefit of retarding the degradation process, but these sealants generally do not prevent the degradation. The drawbacks to this solution are the labor involved in periodically applying the second sealant and the fact that the lenses will still degrade, if only at a slower rate.

Some people attempt a two-step solution. They first strip the damaged silicone hard coat and damaged polycarbonate materials from the plastic surface. Then they apply a different sealant, such as spar varnish or polyurethane. While this solution tends to be a moderately viable solution, these secondary sealants have undesirable qualities. Many of these sealants turn yellow or brown immediately or soon after application. Other sealants become brittle when exposed to the intense heat, such as that produced by the headlight lamps. Once brittle, the sealant layer tends to break up and flake away, leaving the untreated polycarbonate material exposed.

In reviewing the state of the current art, one can see that an alternative to the silicone hard coat sealant is needed. The solution needs to protect the underlying plastic from degrading and should have a long life expectancy, without delaminating or discoloring.

SUMMARY OF THE INVENTION

The problems of oxidizing and degrading vehicular plastics are addressed by applying an epoxy coating. One embodiment employs a kit used to apply an epoxy coating to a vehicular plastic surface. The kit contains an epoxy, an applicator for applying the epoxy to a plastic surface, packaging material, and a set of instructions. Another embodiment includes abrasive materials for removing oxidized and degraded plastics before coating plastic surfaces with an epoxy. In other embodiments, the kits contain sanding and cleaning solutions to help remove the oxidized and degraded plastics and prepare the plastic surfaces for coating with an epoxy.

One embodiment provides an article of manufacture having a plastic member coated with epoxy layer. In another embodiment, the plastic member is made from polycarbonate plastic. In a further embodiment, the epoxy coating includes a one part epoxy. In yet another embodiment, the plastic member is coated with soya-silicone alkyd and epoxy ester resins.

The process of preparing plastic surfaces of vehicles and applying epoxies are disclosed in an embodiment of the invention. Alternative embodiments include additional elements of abrading the plastic surfaces to remove degraded plastic and cleaning the surfaces before applying the epoxies.

One embodiment provides a system that employs epoxy coatings on numerous plastic surfaces of a vehicle. The system contains a headlight assembly, a turn signal assembly, an emergency flasher assembly, a parking light assembly, and a tail light assembly, any one of which may be coated with an epoxy. The system also contains a windshield and windows that may be coated with an epoxy.

BRIEF DESCRIPTION OF THE DRAWINGS

Advantages of the invention will become apparent upon reading the following detailed description and upon reference to the accompanying drawings in which, like references may indicate similar elements:

FIG. 1 depicts an embodiment of a system employing an epoxy coating on the headlight covers, on the windshield, on the plastic tail lights, and on plastic windows;

FIG. 2A depicts an embodiment of a headlight assembly sealed with an epoxy coating;

FIG. 2B illustrates an epoxy sealant applied to a plastic base material;

DETAILED DESCRIPTION OF EMBODIMENTS

Figure 3:
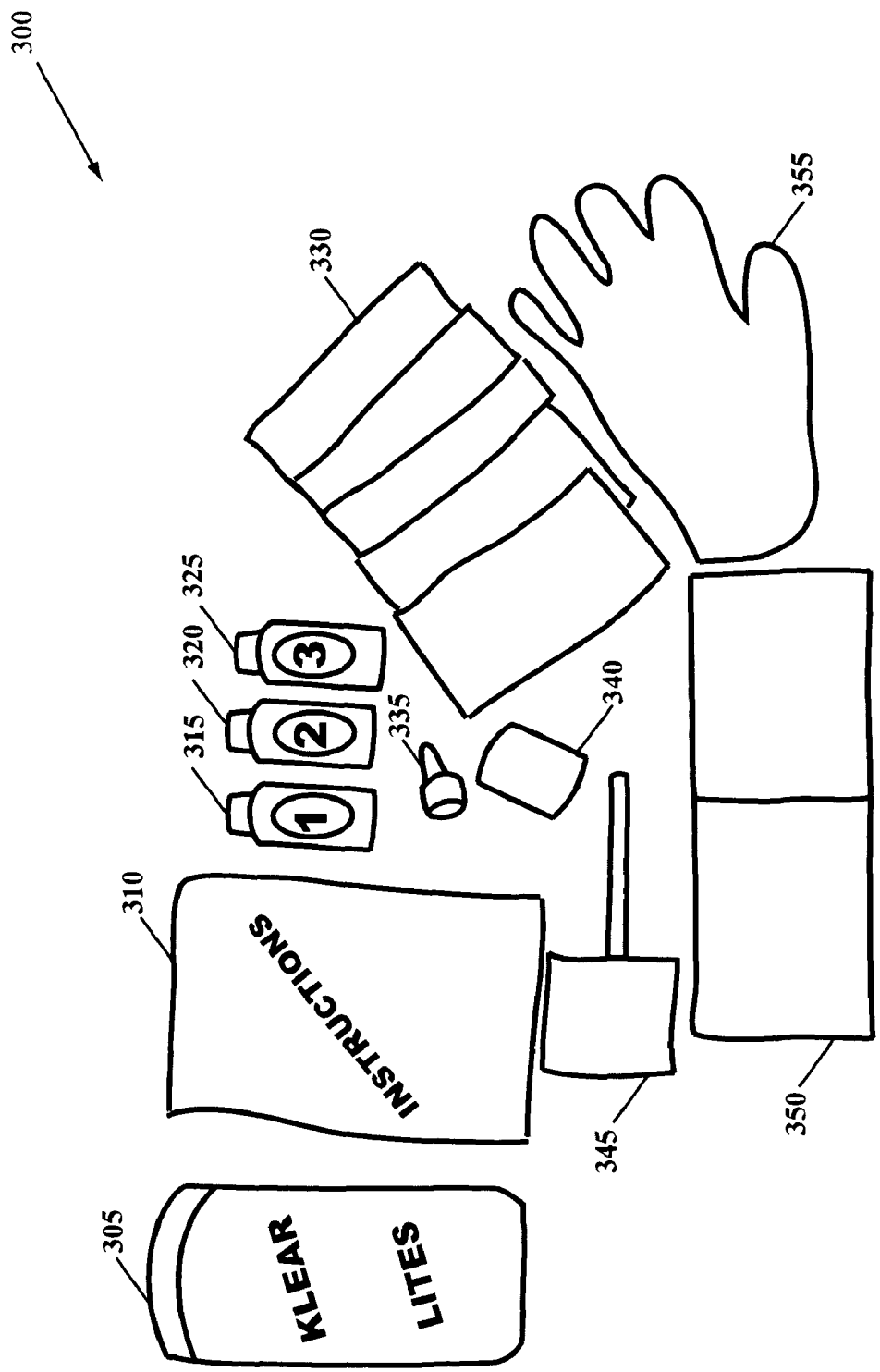
FIG. 3 depicts an embodiment of a kit for sealing vehicular plastics, including an abrasive material, an abrasive solution, a cleaning solution, an epoxy coating, and a sealant applicator.

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, articles of manufacture, and methods for coating vehicular plastics are contemplated. Embodiments comprise various vehicular components made of, e.g., polycarbonate plastics that are substantially clear to facilitate transmission of visible light or visual portions of electromagnetic radiation. The components have a layer of substantially clear epoxy coating the plastic. One embodiment comprises a system to apply an epoxy coating to an automobile headlight assembly. Further embodiments comprise application of an epoxy coating to the automobile tail light lens assembly, to plastic windows of the automobile, and to the plastic windshield of the automobile. The epoxy coating may advantageously seal these various surfaces to protect the automotive plastic from ultraviolet degradation and oxidation. By preventing the degradation and oxidation of the plastic, the plastic retains the new appearance longer and prevents oxidation and degradation from reducing the effectiveness of headlights, taillights, etc., and obstructing the view of the driver on windshields and other windows.

Some embodiments comprise articles of manufacture, wherein an epoxy coating seals a vehicular plastic material. Further embodiments include kits that may be used to repair vehicular plastic damaged via degradation of the prior sealant and oxidation of the plastic. Such embodiments may include an abrasive means for removing damaged hard coat and damaged plastic materials. Some kits also include a solution that may aid in removal of the damaged hard coat and plastic and a solution for cleaning the plastic immediately before applying the epoxy coating.

While specific embodiments will be described below with reference to a one-part epoxy, those of ordinary skill in the art will realize that embodiments of the present invention may be implemented using an epoxy that does not have one-part application characteristics. For example, instead of using a one-part epoxy for sealing the automotive plastic, as disclosed, use of a two-part epoxy is contemplated. Likewise, while specific embodiments describe an epoxy coating on a polycarbonate plastic, alternative embodiments of this invention may instead comprise an epoxy coating on a different type of vehicular plastic, which is adapted to transmit visible light and is susceptible to damage in the absence of a sealant, such as Lexan® or Plexiglass®.

Turning now to the drawings, FIG. 1 depicts an embodiment of an automobile 100 employing an epoxy coating on various automotive plastics. Automobile 100 has a body 160 for carrying passengers and providing structural support for vehicular parts, such as windshields, windows, and headlight assemblies. Passengers may ride in a passenger compartment 155, which is an area of automobile 100. Automobile 100 employs polycarbonates for a windshield 150, a driver-side window 170, and a rear driver-side window 180. Also, automobile 100 comprises polycarbonates for a headlight assembly 120, a parking light assembly 110, a front turn signal assembly 140, a front emergency flashing light assembly 130, and a tail light assembly 190.

While automobile 100 comprises a sport utility vehicle, other vehicles are contemplated. For example, instead of a sport utility vehicle, automobile 100 may be a passenger car or light duty truck. Alternatively, the vehicle may be a motorcycle or a commercial vehicle, such as a semi truck. The vehicle may even be a pleasure boat or an airplane. One skilled in the art will realize that all such vehicles employ plastic for lenses or other light fixture covers, windshields, and windows and may benefit from an epoxy coating.

Headlight assemblies 120 may comprise a polycarbonate plastic coated with an epoxy coating. The polycarbonate plastic may shield and protect headlight lamps, which may not endure extended exposure to harsh environmental conditions, such as water, moisture, sand, dirt, and mud. Additionally, the polycarbonate plastic may be substantially transparent allowing light, in the form of electromagnetic radiation, to pass through and illuminate objects in the path of the vehicle.

In the present embodiment, the epoxy coating on headlight assemblies 120 may comprise a one-part epoxy such as a one-part industrial epoxy containing soya-silicone alkyd and epoxy ester resins. One such epoxy may be Poxycoat® II™, manufactured by the International Coating and Chemical Company, Inc. In further embodiments, other types of epoxy, which vary slightly in either composition or concentration, may be employed.

Coating the headlight assembly with epoxy provides a durable hard coat laminate that can withstand exposure to headlight lamp heat and harsh environmental elements such as wind, rain and snow, without discoloring, deteriorating, or oxidizing. In many embodiments, the epoxy coating may be substantially clear and colorless when cured. In further embodiments, the epoxy coating may have a slight tint. The epoxy coating may also increase the tensile strength of the headlight assemblies' surfaces by strengths between 200 and 500 pounds per square inch, advantageously reducing the likelihood of breakage due to impact from flying road debris, such as rocks and pebbles.

Similar to headlight assemblies 120, the parking light assemblies 110 may be made of a polycarbonate plastic and subjected to harsh environmental conditions. An epoxy coating over the surface of the parking light assemblies 110 may be substantially clear and colorless or may have a tint. For parking light assemblies that include, e.g., an amber tint, the additional protection from ultraviolet rays offered by the epoxy coating may help prevent the tint from fading. In several embodiments, the emergency flashing light assemblies 130, turn signal light assemblies 140, and tail light assemblies 190 may also be sealed with an epoxy coating.

Aside from headlight assemblies, tail light assemblies, and parking light assemblies being made from plastic, many automobiles such as automobile 100 may also employ plastics for windshields and other windows such as windshield 150, side windows 170, and rear window 180. For example, automobile manufacturers have occasionally used Plexiglass® for windshields and rear windows. Similar to polycarbonate plastics used for headlight, brake light, and turn signal assemblies, plastic windows 170 and windshields 150 may help shield vehicle passengers from surrounding environmental conditions, such as wind, rain, and snow, while still allowing the passengers to see objects outside or beyond the vehicle. Passengers are able to see such objects because light from the objects, again in the form of electromagnetic radiation, pass though the plastic and allow passengers to visually perceive their presence.

Plastics are advantageously lightweight with respect to glass counterparts and have favorable characteristics such as a high impact resistance and low impact splintering. As a result, manufacturers are increasingly turning to plastic as a replacement for glass windows and windshields. Epoxy coatings on the surfaces of plastic windshields 150, and windows, 170 and 180, may protect them from ultraviolet degradation, oxidation, and breakage.

FIG. 2A depicts an embodiment of an article of manufacture 200. The article 200 comprises an automotive headlight assembly body 220 and a relatively flat facial lens surface 230. The headlight assembly body 220 may house an area 215, located behind the lens surface 230 and ahead of the rear portion of the headlight assembly body 220. Lamp assemblies and reflective headlight mirrors may reside inside the area 215.

In one embodiment, the headlight assembly body 220 may be made from polycarbonate thermoplastic. An epoxy coating 210 may cover the lens surface 230. In one embodiment, the epoxy coating 210 may comprise a one-part industrial epoxy hard coat containing soya-silicone alkyd and epoxy ester resins.

In an alternative embodiment, the article of manufacture 200 may be a tail light assembly, parking light assembly, turn signal lamp cover, window, or the like. In further embodiments, the front facial surface may be moderately or even severely curved, depending on the mounting location of the lens and shape of the automobile. The epoxy coating 210 will seal and protect the lens surface 230, even when the lens surface 230 is curved.

In several embodiments, the article of manufacture 200 may comprise a re-manufactured part having the epoxy coating 210 applied after the headlight assembly body 220 has been mounted on the automobile. For instance, the lens assembly may initially have a different hard coat material such as silicone. The epoxy coating 210 may then be applied over the silicone hard coat, or directly to the underlying plastic surface after removing the silicone hard coat and, if applicable, any damaged plastic.

The embodiment shown in FIG. 2B is an exploded cut-away side view of a vehicular plastic member 250 sealed with a thin layer of one-part industrial epoxy 270. The vehicular plastic member 250 may comprise a polycarbonate, Lexan®, Plexiglass®, or similar plastic. The thin layer of one-part industrial epoxy 270 may comprise a thermosetting epoxide polymer and may adhere directly to a surface 260 of the vehicular plastic member 250. By way of example, the vehicular plastic member 250 may be a windshield for a motorcycle or a headlight of a semi truck. In further embodiments, the epoxy layer 270 may be a dipropylene glycol mono-n-propyl ether epoxy.

Referring now to FIG. 3, there is shown an embodiment of a kit 300 for applying an epoxy coating to a vehicular plastic. In many embodiments, kit 300 will provide materials to facilitate application of an epoxy 325 directly to an unsealed vehicular plastic. In some embodiments, kit 300 may also include materials to strip an existing hard coat, such as a silicone hard coat, and damaged plastic from the vehicular plastic before applying the epoxy 325. In the present embodiment, kit 300 is adapted to seal and protect vehicular plastics, such as plastic on cars, trucks, motorcycles, SUVs, boats, planes, and etc., whether they are designed for commercial, industrial, or consumer purposes.

Kit 300 may contain numerous items that facilitate applying an epoxy coating to a variety of vehicular plastics. First, kit 300 may contain an abrasive material 330 for removing any existing sealant or hard coat material that may already coat the existing plastic. The abrasive material 330 may also be used for removing any oxidized or otherwise damaged surface plastic. In this particular embodiment, the abrasive material 330 consists of 4 different grades of 3 inches by 5.5 inches silicone carbide wet and dry sandpaper. The abrasive material 330 consists of two sheets of 400 grit sandpaper, one sheet of 1000 grit sandpaper, one sheet of 2500 grit sandpaper, and one sheet of 3000 grit sandpaper. Other embodiments of may use a variety of different sandpaper grits, such as 220, 320, 600, 800, 1500, and 2000 grit. Further embodiments may even use steel wool, nylon, cloth, fiber, or other abrasive material. Alternatively, some embodiments may employ a solvent material to dissolve and remove the hard coat and any damaged plastic.

Worth noting, the term 'sandpaper' generally describes abrasive grit on flexible backing sheets used to smooth many types of material. True 'sandpaper', which is backing paper covered with grains of sand, is generally no longer commercially available but has been replaced by backing sheets covered with glass, aluminum oxide, silicon carbide, garnet, or other special grit materials. Generally people use the terms 'sandpaper' and 'glass paper' to cover all types of grit attached to a backing sheet. 'Sandpaper', as used in this application, generally refers to the family of sheet type abrasives.

To aid in removal of the existing hard coat and damaged plastic by sanding, kit 300 includes two ounces of a sanding solution 315. This sanding solution 315 may be applied to the plastic surface immediately before sanding or directly to the abrasive material. The sanding solution 315 may be a solvent, lubricating oil, water, a soft resin, an oleoresin, a mineral distillation, or a combination of these elements. In this embodiment, the sanding solution 315 is a mixture of one part transmission fluid, essentially red lubrication oil, and seven parts mineral spirits. The lubricant, transmission fluid in this particular embodiment, helps keep both the sandpaper and the plastic surface cool during the sanding process. Additionally, the lubrication oil prevents the sandpaper grit from clogging, which leaves the abrasive grit free to cleanly cut and smooth the surface. Preventing the formation of fine air-born dust created by the loosened hard coat and plastic during the abrasion process is a secondary advantage of using the sanding solution 315. Working in conjunction with the lubricating oil, the mineral spirits help loosen the silicone hard coat, damaged surface plastic, and any surface contaminants, such as dirt, grime, or oil from the plastic surface.

In addition to the sanding solution 315, kit 300 may contain several ounces of a cleaning solution 320 which may be used with the paper towels 350. Once the hard coat and damaged plastic materials have been abraded and severed from the surface of the plastic, the cleaning solution 320 may be applied to one or more paper towels 350 and used to clean any residue left by the abrasion procedure. After each incremental sanding stage, the scoured plastic and hard coat materials may be removed with one or more of the paper towels 350.

Similar to the different elements used for the sanding solution 315, the cleaning solution 320 may comprise varying amounts of solvents, lubricating oils, water, and mineral spirits. In one particular embodiment, the cleaning solution 320 may comprise a mixture of sixty parts mineral spirits to one part transmission fluid. Making the cleaning solution 320 with a blue transmission fluid may help distinguish the sanding solution 315 from the cleaning solution 320. Again, the mineral spirits may help remove any dirt or grime from the plastic surface and prepare the plastic for sealing.

Once the existing hard coat and damaged plastic have been removed from the plastic surface, and the surface has been cleaned with the cleaning solution 320, the plastic may then be coated with an epoxy 325. Kit 300 contains an epoxy applicator tip 335 that may be affixed to the epoxy 325 container, which may aid in applying the epoxy 325 to the plastic surface and to an epoxy applicator 345.

The methods of applying the epoxy 325 to the plastic vary. Using a method successfully demonstrated, a person may apply a small amount of the epoxy 325 to both sides of the epoxy applicator 345 and small bead of the epoxy 325 directly on the plastic surface using the epoxy applicator tip 335. Using deliberate motions, a person may spread the epoxy 325 to a substantially uniform thickness of approximately one millimeter, coating the plastic surface.

The epoxy 325 may comprise a one-part industrial epoxy or a multi-part industrial epoxy. Generally, one may prefer a one-part epoxy for the sake of convenience. In basic form, many one-part industrial epoxies have relatively thick consistencies. By way of comparison only, an unaltered epoxy may have a consistency similar to honey. To make applying the epoxy easier, one may thin the epoxy with a suitable epoxy thinner. Depending on the type and quantity of epoxy thinner used, the resulting epoxy and thinner combination may vary in consistency from, again by way of example, thick honey to a relatively thin solution, similar to that of water. A mixture of one part epoxy to one part thinner (1:1) generally allows application of the epoxy coating solution in a wide range of conditions, facilitates applying the epoxy coating in a thin layer, provides relative ease in application, and generally allows the epoxy coating to cure in a relatively short amount of time.

As alluded to above, numerous types of epoxy resins exist and many may be suitable for use as the epoxy 325. In one embodiment, the epoxy 325 may comprise a one-part industrial epoxy with soya-silicone alkyd and epoxy ester resins, diluted with an epoxy thinner. In alternative embodiments, the epoxy 325 may exist as a two-part epoxy, mixed before or during application. Similar to a one-part epoxy, a two-part epoxy may be thinned to facilitate applying the epoxy 325 to the plastic.

Aside from the sanding solution 315, the cleaning solution 320, and the epoxy 325, kit 300 may contain several amenities to help safely remove hard coat and damaged plastic material. Kit 300 may provide a latex glove 355 to help prevent incidental skin contact with any of the solutions or sealer during application. Kit 300 may also include a disposable pair of safety eye shields 340, to help prevent any sanding debris, the cleaning solution 320, or the epoxy 325 from accidentally entering the eyes of a person during the coating procedure. A container 305 may store all of kit 300 elements until time of use. A set of instructions and warnings 310 may provide detailed information for using kit 300 elements for removing the damaged plastic and applying the epoxy 325.

Figure 4A:
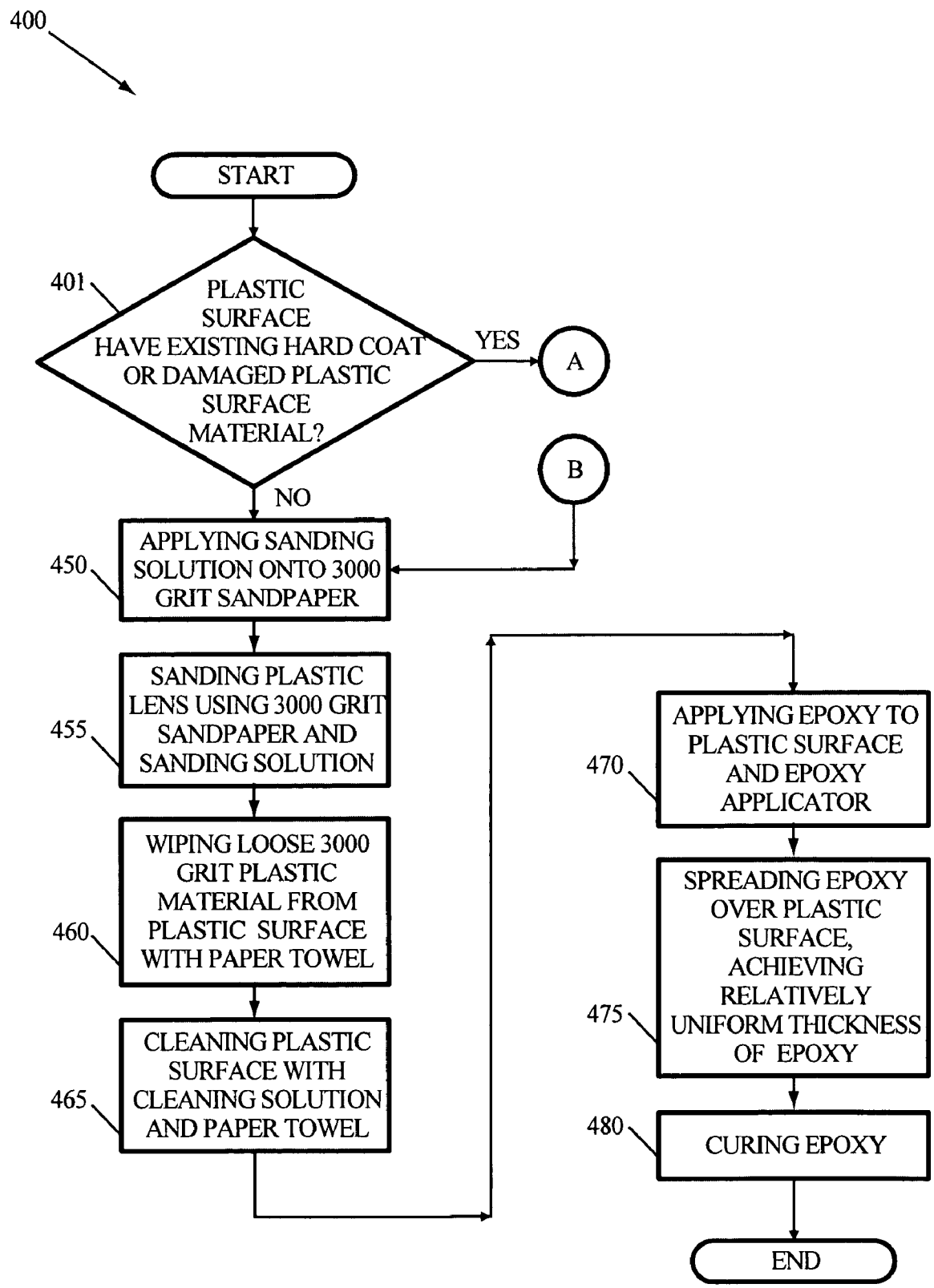
FIGS. 4A-4B show an example flow chart for removing damaged plastic and hard coat materials from a plastic surface and sealing the plastic surface with an epoxy coating.
Figure 4B:
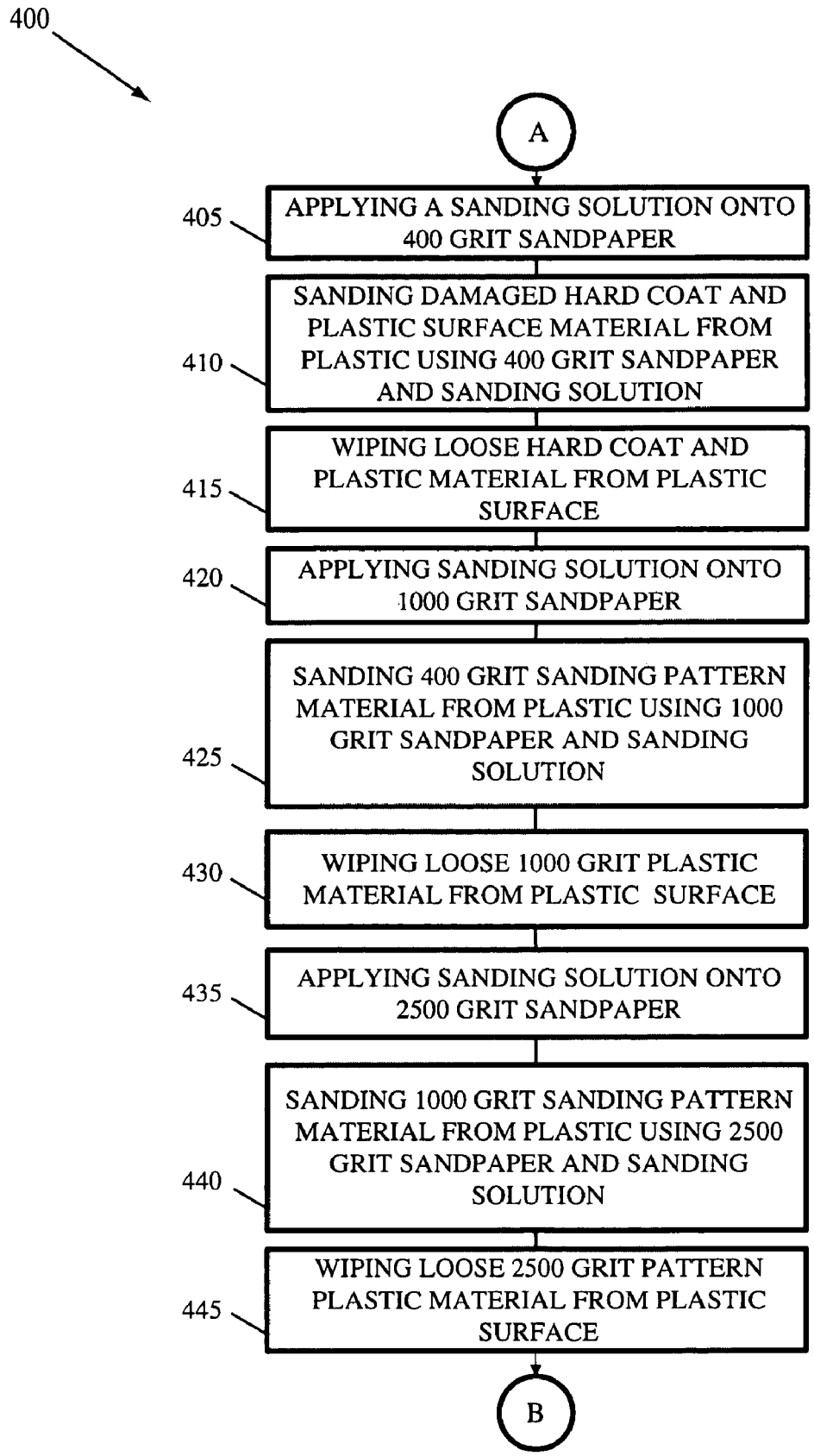

Concluding our detailed description of embodiments we turn now to FIGS. 4A and 4B, showing an example flowchart of a method for coating vehicular plastic. Flow chart 400 begins with determining whether the plastic surface has an existing hard coat layer or damaged plastic (element 401). If the vehicular plastic has existing hard coat material or damaged plastic, which will be the case when applying an epoxy coating to vehicular plastic of a used automobile, for example, this damaged plastic material may first be removed before applying the epoxy coating. However, in manufacturing plastic for a new vehicle, the process of removing the hard coat and damaged plastic may be unnecessary.

Hard Coat and Damaged Plastic Removal

To increase adhesion of the epoxy coating, improve the appearance of the coated plastic, and minimize the number of surface imperfections which may deflect visible passing through the plastic, any existing hard coat and damaged plastic material may first be removed. While a variety of means may be used to remove any damaged surface plastic and hard coat material, including such means as solvents and various abrasives, an orderly application of increasingly finer grit sandpaper may effectively remove hard coat and damaged surface plastic materials.

Initially, a course 400 grit sandpaper may be used to remove the damaged surface plastic and hard coat materials. The 400 grit sandpaper, which is relatively course, may quickly remove the existing hard coat and any damaged plastic without severely gouging the plastic surface. To aid in removal of the surface materials on the plastic, a sanding solution may be applied to the sandpaper (element 405). The sanding solution may be a mixture of a light lubricating oil and mineral spirits. After applying the sanding solution to the 400 grit sandpaper, the plastic surface may be sanded to remove the hard coat and damaged surface plastic (element 410). After sanding the plastic surface with 400 grit sandpaper and sanding solution, the sanded plastic debris may be removed by wiping the surface with a cloth or paper towel (element 415).

Starting the abrasion process with a course abrasive material, versus a more fine abrasive material, has the benefit of rapidly removing the damaged surface material. However, a consequence of starting with a course material is surface scouring. These course scour patterns tend to diffuse light rays that pass through the plastic. To ensure proper collation of light rays passing through the plastic medium, successively finer grits of sandpaper may be used to eradicate the course scour patterns. Using various grades of sandpaper, from a course grit to a relatively fine grit, may ensure that existing hard coat and damaged plastic materials are removed in such a manner to minimize surface imperfections. Severe surface imperfections are undesirable for both aesthetics and, in the case of a vehicle headlight lens, skewing of light rays.

Applying the sanding solution to a 1000 grit sandpaper (element 420), sanding the plastic surface with the 1000 grit sandpaper and sanding solution (element 425) and wiping the plastic clean with a cloth or paper towel (element 430) may remove the scour patterns created by the 400 grit sandpaper. Further, applying the sanding solution to a 2500 grit sandpaper (element 435) and sanding the plastic surface with the 2500 grit sandpaper and sanding solution (element 440) may remove the finer scour patterns created by the 1000 grit sandpaper. The resulting 2500 grit plastic debris may then be removed by wiping the plastic clean with a cloth or paper towel (element 445).

Surface Preparation and Epoxy Coating Application

After any damaged surface plastic and existing hard coat materials have been removed, the surface of the plastic may then be prepared for application of the epoxy coating. The sanding solution may be applied to 3000 grit sandpaper (element 450) before sanding the plastic surface with the sandpaper (element 455). Even if the surface had no damaged surface plastic or hard coat materials, sanding the surface with 3000 grit sandpaper may help improve epoxy coating adhesion by increasing the overall contact area between the epoxy and the plastic. This improved adhesion may help prevent delamination and separation of the epoxy coating.

After sanding the surface with 3000 grit sandpaper (element 455), the sanded plastic surface debris may be removed with a cloth or paper towel (element 460). Once the 3000 grit debris has been wiped away, the surface may be cleaned by applying cleaning solution to a paper towel and thoroughly wiping the plastic surface (element 465). The cleaning solution may comprise varying amounts of solvents, water, mineral spirits, and lubricating oil.

After cleaning and preparing the surface, the epoxy coating may be applied to the plastic surface (element 470). The epoxy material may be applied to the surface in a variety of ways. In one embodiment a manufacturer may spray the epoxy material using a pressurized spray assembly. Applying the epoxy coating with a spray assembly advantageously provides the manufacturer with flexibility in the way the epoxy may be applied. For example, the manufacturer may control a number of manufacturing variables, such as epoxy application rate, epoxy laminate thickness, and the location of epoxy application. Additionally, spraying the epoxy may even allow the manufacturer the ability to apply the epoxy without first using an epoxy thinning material, such as mineral spirits.

Generally, epoxies are moderately to severely viscous in their basic form. In order to make application easier, people may thin the epoxies using special epoxy thinning materials. Frequently, epoxy thinners are petroleum-based and require petroleum-base thinners. Common epoxy thinners are often referred to as paraffins, or aliphatic solvents, such as kerosene or mineral spirits. After applying the epoxy-thinner composition, thinners may evaporate from the epoxy-thinner mixture leaving only cured epoxy on the plastic. In various embodiments, the epoxy-thinner solution may vary in epoxy concentration, with mixtures ranging from one part epoxy to ninety-nine parts thinner (1:99), to one hundred percent epoxy with no thinner (100:0). However, a mixture of one part epoxy to one part thinner (1:1) allows application of the epoxy in a wide range of settings.

In an alternative embodiment the epoxy material, thinned or not, may be applied with an applicator, such as a brush or roller (element 470). Further, one may even immerse the plastic surface in an epoxy bath, withdraw the plastic surface from the epoxy bath, and allow the epoxy to cure. Even further, an epoxy film may be manufactured separately and applied to the plastic surface with an industrial adhesive. One variation of applying the epoxy coating via an epoxy film would be to cure the film to the plastic surface by baking the film and plastic in an industrial oven. All such manufacturing and application techniques may be used, depending on the application needs, and still come within the scope of this invention.

The epoxy coating may be applied to the plastic surface using an applicator brush. The epoxy coating may be applied directly to the plastic surface and to the applicator brush (element 470). The epoxy coating may be spread over the area of the plastic surface, using the applicator brush, to achieve a uniform epoxy film thickness of approximately one millimeter (element 475). After application, the epoxy coating should be allowed time to cure before placing the plastic in contact with elements which may weaken the film, such as dirt, dust, water, or wind (element 480). Allowing the epoxy coating sufficient curing time helps ensure that the hard coat will provide many years of reliable service.

It will be apparent to those skilled in the art having the benefit of this disclosure that the present invention contemplates systems, articles of manufacture, and methods for coating vehicular plastics with an epoxy. It is understood that the form of the invention shown and described in the detailed description and the drawings are to be taken merely as examples. It is intended that the following claims be interpreted broadly to embrace all the variations of the example embodiments disclosed.

What is claimed is:

1. A kit, comprising:
    an epoxy to adhere to a surface of a plastic cover of a vehicle headlight to coat the surface after removal of a damaged portion of the surface of the plastic cover, wherein the epoxy is substantially clear and colorless when cured, wherein further the epoxy is a one-part epoxy and comprises soya-silicone alkyd and epoxy ester resins;
    a container to contain the epoxy, wherein the container is substantially impermeable to air to substantially reduce curing of the epoxy for a period of time;
    at least two different grades of sandpaper which enable removal of the damaged portion;
    a cleaning solution which enables preparation of the plastic cover for sealing with the epoxy;
    an applicator to apply the epoxy to the surface of the plastic cover;
    a packaging material to package the container, the epoxy within the container, the at least two different grades of sandpaper, the cleaning solution, and the applicator; and
    a set of instructions to apply the epoxy to the surface of the plastic cover, wherein the set of instructions specify removal of the damaged portion from the vehicle headlight via the at least two different grades of sandpaper, specify preparation of the plastic cover for sealing via the cleaning solution, and specify application of the epoxy via the applicator.

2. The kit of claim 1, further comprising one or more latex gloves to avoid contact between the epoxy and a person that applies the epoxy to the surface of the plastic cover.

3. The kit of claim 1, wherein the applicator comprises a foam brush being between one-half inch and six inches in width.

4. The kit of claim 3, further comprising a mixture of mineral spirits and oil, the mixture to reduce build-up of particles from the damaged portion on one of the at least two different grades of sandpaper while removing the damaged portion from the surface.

5. The kit of claim 4, further comprising a mineral spirits solution to clean the damaged portion of the surface of the plastic cover from the surface of the plastic cover after removal of the damaged portion.

6. The kit of claim 5, wherein the at least two different grades of sandpaper comprise a coarse grit silicon carbide wet and dry sandpaper to remove the damaged portion from the surface and a fine grit silicon carbide wet and dry sandpaper to smooth the surface after removing the damaged portion.

7. The kit of claim 6, wherein the epoxy is air curable.

8. The kit of claim 7, wherein the epoxy, when cured, increases the tensile strength of the surface of the plastic cover of the vehicle headlight between 200 and 500 pounds per square inch.

9. The kit of claim 8, wherein the epoxy, when cured, is capable of withstanding heat of a headlamp of the vehicle headlight and exposure to moisture and dirt without substantially discoloring, deteriorating, and oxidizing.

10. The kit of claim 9, wherein the epoxy is diluted with an epoxy thinner.

11. The kit of claim 10, wherein the mixture of the epoxy and the epoxy thinner comprises one part epoxy to one part thinner.

12. The kit of claim 11, wherein the epoxy thinner comprises a petroleum-based thinner.

13. A kit, comprising:
    a solvent, wherein the solvent is capable of dissolving and removing a silicone hard coat and a damaged portion of plastic of a surface of a headlight of a vehicle;
    a cleaning solution to prepare the surface for sealing;
    a one-part epoxy to seal the surface, wherein the one-part epoxy comprises soya-silicone alkyd and epoxy ester resins and is substantially clear and colorless when cured;
    a foam brush to apply the one-part epoxy to the surface; and
    a set of instructions which provides information to dissolve and remove the silicone hard coat and the damaged portion of plastic via the solvent, provides information to prepare the surface via the cleaning solution, and provides information to apply the one-part epoxy to the surface via the foam brush.

14. The kit of claim 13, wherein the damaged portion of plastic comprises polycarbonate plastic.

15. A kit, comprising:
    an abrasive material to separate a damaged portion of a surface of a headlight of a vehicle;
    a cleaning solution to prepare the surface for sealing;
    a one-part epoxy to seal the surface, wherein the one-part epoxy comprises soya-silicone alkyd and epoxy ester resins and is substantially clear and colorless when cured;
    an applicator brush to apply the one-part epoxy to the surface; and
    a set of instructions which provides information to remove the damaged portion via the abrasive material, provides information to prepare the surface via the cleaning solution, and provides information to apply the one-part epoxy to the surface via the applicator brush.

16. The kit of claim 15, wherein the abrasive material comprises a coarse grit silicon carbide wet and dry sandpaper and a fine grit silicon carbide wet and dry sandpaper.

17. The kit of claim 16, further comprising one or more latex gloves to avoid contact between the one-part epoxy and a person that applies the one-part epoxy to the surface.

18. The kit of claim 17, wherein the one-part epoxy, when cured, increases the tensile strength of the surface without the damaged portion between 200 and 500 pounds per square inch.

19. A kit, comprising:
    an abrasive material to separate a damaged portion of a surface of a headlight of a vehicle;
    a cleaning solution to prepare the surface for sealing;
    a two-part epoxy to seal the surface, wherein the two-part epoxy comprises soya-silicone alkyd and epoxy ester resins and is substantially clear and colorless when cured;
    an applicator brush to apply the two-part epoxy to the surface; and
    a set of instructions which provides information to remove the damaged portion via the abrasive material, provides information to prepare the plastic surface via the cleaning solution, and provides information to apply the two-part epoxy to the surface via the applicator brush.

20. The kit of claim 19, wherein the damaged portion comprises polycarbonate plastic.

* * * * *